United States Patent [19]

Gokita

[11] Patent Number: 4,651,222

[45] Date of Patent: Mar. 17, 1987

[54] PICTURE IMAGE FORMING APPARATUS

[75] Inventor: Masami Gokita, Tokyo, Japan

[73] Assignee: Kabushiki Kaisha Toshiba, Kawasaki, Japan

[21] Appl. No.: 743,706

[22] Filed: Jun. 11, 1985

[30] Foreign Application Priority Data

Jun. 11, 1984 [JP] Japan .................................. 57-119512

[51] Int. Cl.$^4$ .............................................. H04N 1/36
[52] U.S. Cl. ...................................... 358/264; 358/75; 358/283; 358/285; 358/293
[58] Field of Search ............... 358/256, 285, 286, 293, 358/294, 264, 283, 75; 250/578

[56] References Cited

U.S. PATENT DOCUMENTS 4,348,697 9/1982 Takahashi et al. .................. 358/285
4,527,885 2/1985 Ayata et al. .......................... 358/256

Primary Examiner—Edward L. Coles, Sr.
Attorney, Agent, or Firm—Schwartz, Jeffery, Schwaab, Mack, Blumenthal & Evans

[57] ABSTRACT

In a copying machine in which a picture image on a manuscript is read by an optical scanner to form a picture image information and the picture image is printed on a copying paper with a printing ribbon, all pulses for operating various elements of the copying machine being synchronized.

13 Claims, 22 Drawing Figures

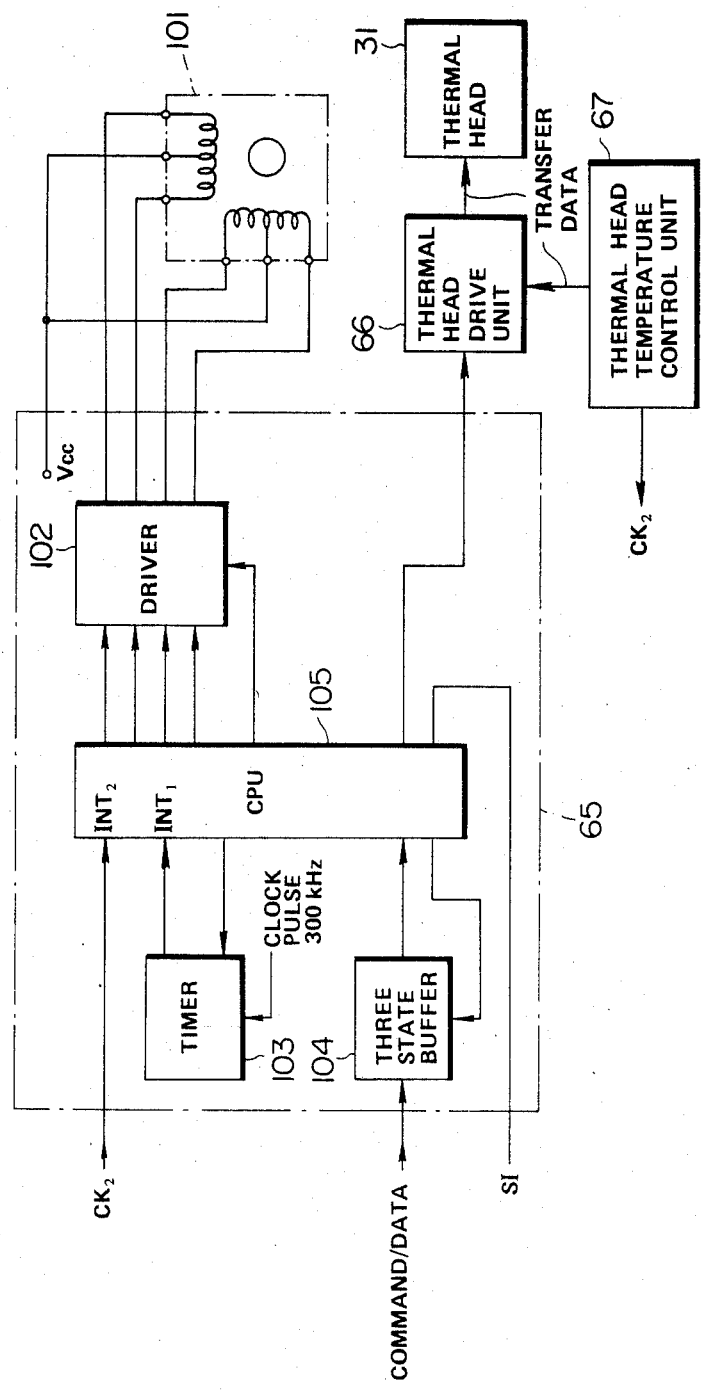

PICTURE IMAGE FORMING APPARATUS

BACKGROUND OF THE INVENTION

1. Field of the Invention

This invention relates to a picture image forming apparatus suitable for use in a heat transfer printing type color copying machine or the like, and more particularly, a picture image forming apparatus wherein read means of a manuscript and picture image forming means are driven by independent clock pulses.

2. Description of the Prior Art

In recent years, a heat transfer type color copying machine has been proposed in which a multicolor heat transfer ink ribbon, for example, is used for effecting color copying. Briefly stated, according to this copying machine, a manuscript is read by scanning it with optical read means, that is scanning means for deriving out picture image informations (color signals of light), converting the picture image informations into color signals corresponding to respective colors of ink of the heat transfer printing ink ribbon, selecting corresponding ink portions of the heat transfer printing ink ribbon in accordance with the color signals, and then heat transferring the ink onto a copying paper by using a heat sensitive head so as to transfer print respective colors onto the copying paper, thus effecting color copying.

The prior art copying machine of the type described above is constructed such that a series of operations starting from the reading of the manuscript with the scanning means to the transfer printing of the picture image with the thermal head are performed with a fixed clock pulse. However, the read speed of a photoelectric converter utilized for reading the manuscript with the scanning means, the transfer printing speed (that is the picture image forming speed) determined by the capacity of a power source and the heat storage of the thermal head, and the processing speed of signal converting means that effects color conversion are not equal so that when one tries to drive these means with a definite clock pulse it is difficult to optimumly design various elements, thereby resulting in faults and cost up.

Also in the prior art copying machine, at the time of reading the manuscript, the photoelectric converting apparatus is moved along the manuscript, while at the time of transfer printing the picture image the copying paper is moved to a point in front of the thermal head, and pulse motors are used for moving the photoelectric converting apparatus and the paper at high accuracies. When it is intended to operate the pulse motors at high speeds higher than the self-starting regions, it is necessary to slowly increasing and decreasing their speeds. In such case, it is impossible to drive the pulse motors with a clock pulse of a fixed frequency.

SUMMARY OF THE INVENTION

It is an object of this invention to provide improved picture image forming apparatus in which the read means of a manuscript and picture image forming means are driven by independent clock pulses thereby facilitating the design of the manuscript read means and the picture image forming means.

Another object of this invention is to provide a novel picture image forming apparatus capable of operating at high speeds pulse motors utilized for reading the manuscript and for moving the copying paper in a range other than the self-starting range, thus enabling the picture image forming apparatus to operate at high speeds.

Briefly stated, according to this invention, all steps of from the reading of the manuscript by scanning means to the picture image forming by picture image forming means are executed with different pulses so as to readily synchronize the pulses.

According to this invention there is provided a picture image forming apparatus comprising manuscript read means including means for optically scanning a manuscript to read a picture image on the manuscript so as to output a picture image information corresponding to the read picture image, picture image forming means responsive to the picture image information for forming another picture image on a copying medium corresponding to the picture image on the manuscript by using a picture image forming medium, first control means for controlling the manuscript read means in accordance with a first pulse signal, second control means for controlling the picture image forming means in accordance with a second pulse signal formed independently of the first pulse signal and means for synchronizing the picture information and the second pulse signal controlling the picture image forming means based on the first pulse signal.

BRIEF DESCRIPTION OF THE DRAWINGS

In the accompanying drawings:

FIG. 15 is a block diagram showing the construction of a conveyance control unit;

DESCRIPTION OF THE PREFERRED EMBODIMENT

Figure 1:
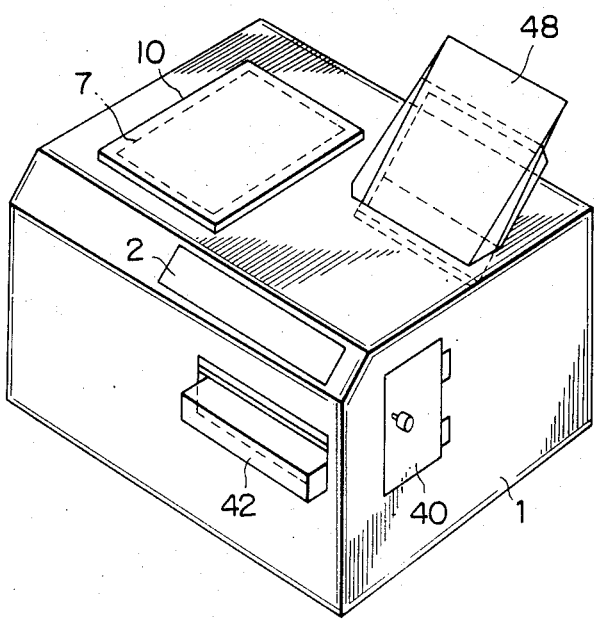
FIG. 1 is a perspective view showing the external contour of the picture image forming apparatus embodying the invention.
Figure 2:
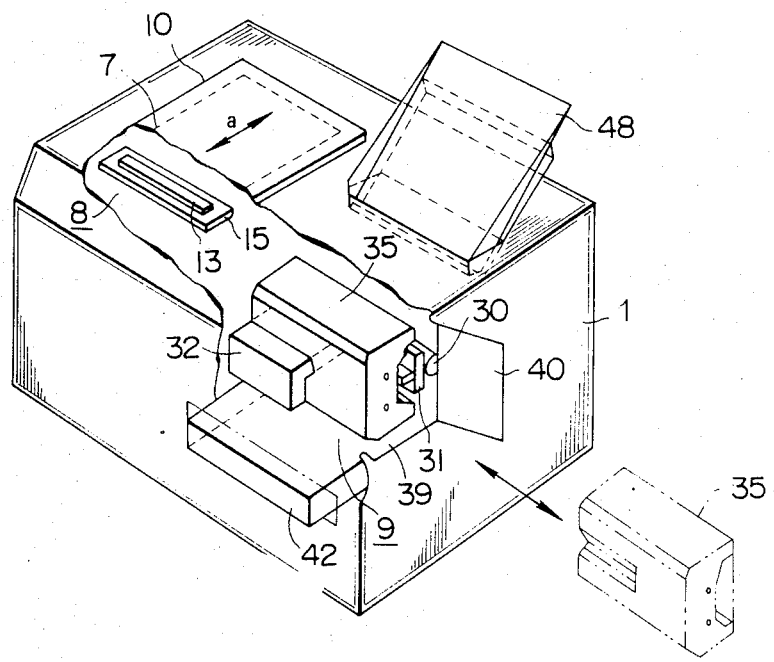
FIG. 2 is a perspective view showing the apparatus shown in FIG. 1 with a portion cut away.

A preferred embodiment of the picture image forming apparatus shown in FIGS. 1 and 2 (in this example, a heat transfer printing type color copying machine) comprises a casing 1 having an operating panel 2 at the upper portion of the front surface, a manuscript support 7 made of a transparent glass plate at the left side of the upper surface of the casing 1, a manuscript scanning unit 8 for scanning and reading a manuscript, not shown, mounted on the support 7, a picture image forming unit 9 on the right side, and a manuscript cover 10 hinged to the manuscript support 7.

Figure 3:
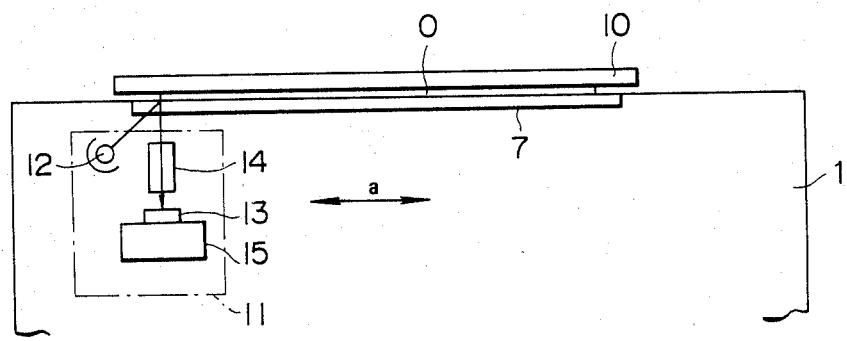
FIG. 3 is a side view diagrammatically showing a manuscript scanning unit.
Figure 4:
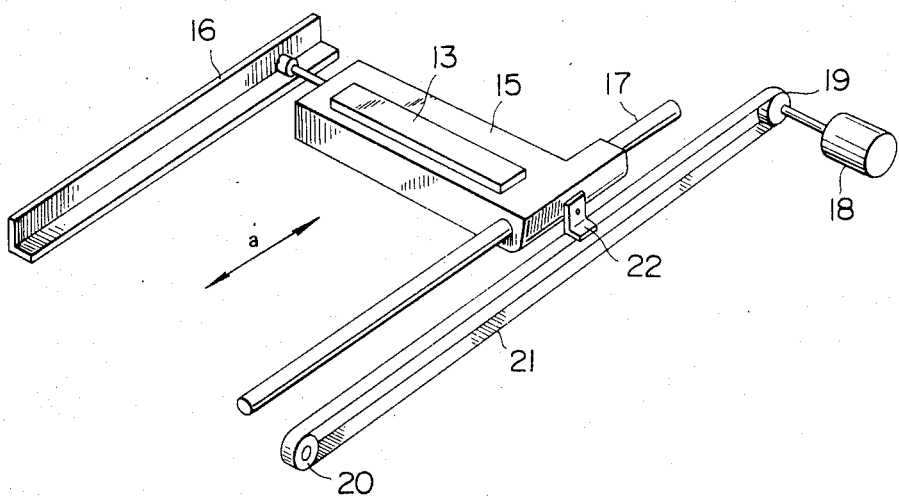
FIG. 4 is a perspective view showing the scanning device moving mechanism of the manuscript scanning unit.

The manuscript scanning unit 8 is constructed as shown in FIGS. 2–4. More particularly, the manuscript support 7 is secured to the casing 1 and a scanning device 11 disposed beneath the manuscript support 7. The scanning device 11 is reciprocated in a direction of arrow a along the lower surface of the support 7 for optically scanning a manuscript 0 mounted on the support 7 to read the manuscript. The scanning device 11 is constituted by a lamp 12 for illuminating the manuscript 0, a photoelectric converter 13 receiving light reflected by the manuscript 0, an optical system 14 including a lense for conveying the reflected light to the photoelectric converter 13, and a carriage 15 for supporting the elements described above. The photoelectric converter 13 converts the reflected light from the manuscript 0 into picture image informations for outputting color signals of green (G), yellow (Y) and cyan (C) for each picture element. The photoelectric converter is constituted by a charge coupled device (CCD) type line image sensor, for example. As shown in FIG. 4, the carriage 15 is reciprocated in the direction of arrow a by being guided by a guide rail 16 and a guide shaft 17. On one side of the guide shaft 17 disposed is a drive pulley 19 driven by a reversible scanning pulse motor 18 and on the other end dispose, a driven pulley 20 driven by the drive pulley 19 through an endless belt 21, a point thereof being connected to the carriage 15 through a fixing member 22 whereby the carriage 15 is moved linearly as the scanning motor 18 rotates in the forward or reverse direction.

Figure 5:
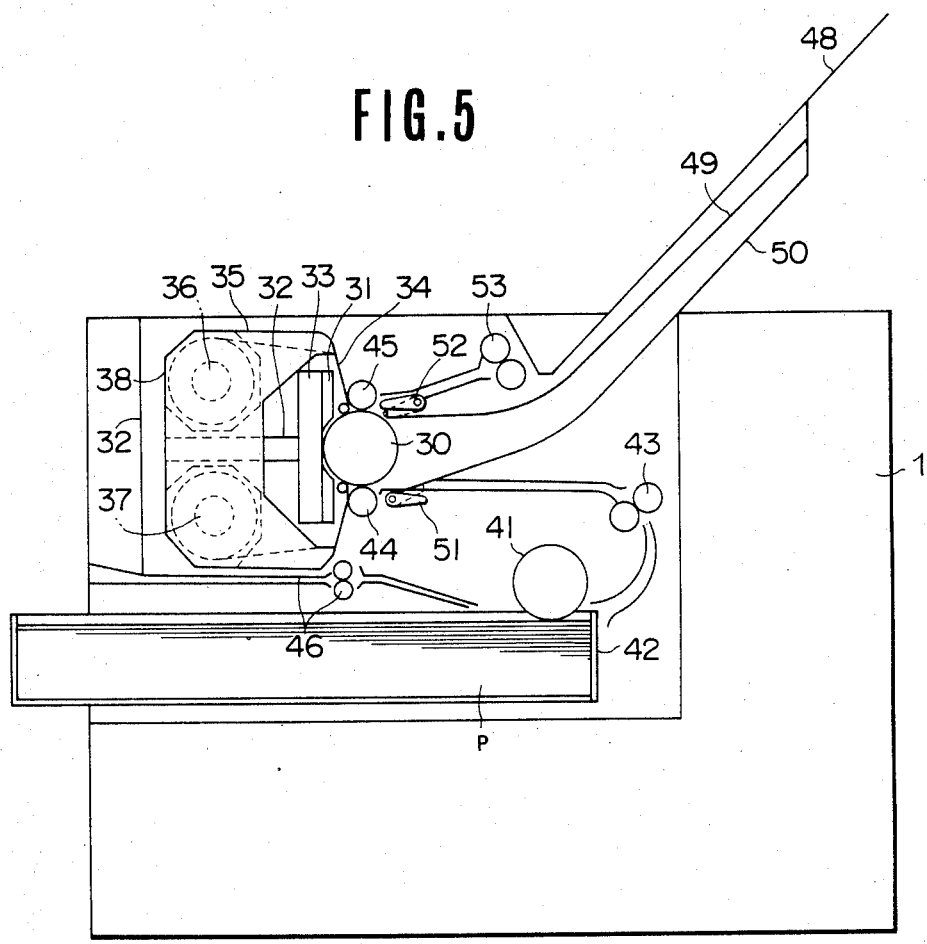
FIG. 5 is a longitudinal sectional view showing the construction of the picture image forming unit.

The picture image forming unit 9 is constructed as shown in FIGS. 2 and 5. Thus a platen 30 is disposed at substantially the center of the picture image forming unit 9 and a thermal head 31 is disposed to contact with the lefthand side of the platen 30. The thermal head 31 is supported by a heat radiator 33 integrally formed on the inner end of a holder 32. A ribbon cassette 35 containing a heat transfer printing ink ribbon acting as an ink donor means is removably mounted through the holder 32 so as to interpose the ink ribbon 34 between the thermal head 31 and the platen 30. As shown in FIG. 5, the ribbon cassette 34 includes a pair of parallel winding cores 36 and 37 for taking up opposite ends of the ink ribbon 34 and the ribbon cassette is covered by a casing 38 with a portion cut away for exposing and interposing an intermediate portion of the ink ribbon 34 between the platen 30 and the thermal head 31. The cores 36 and 37 are coupled to the shafts of drive motors (for example, pulse motors), not shown, through motion transmission mechanisms also not shown, so as to be driven when necessary. As shown in FIG. 3, the ribbon cassette 35 can be mounted on or dismounted from the holder 32 through an opening 39 at the right-side surface of the casing 1. The opening 39 is provided with a hinged door 40.

As shown in FIG. 5, a paper feed roller 41 is provided at a right lower position of the platen 30 for taking out one after one. The copying papers P contained in a paper cassette 42. The copying papers P taken out by the paper feed roller 41 are sent to a resist rollers 43 located above the paper feed roller 41 for aligning the leading edges of the copying papers P. Then the copying papers are sent to the platen 30 by the resist rollers 43 and the leading edges of each paper is wrapped about the platen 30 by push rollers 44 and 45. The paper feed cassette 42 is removably mounted on the casing 1. In FIG. 5, a manual paper feeding device 46 is provided.

Figure 6:
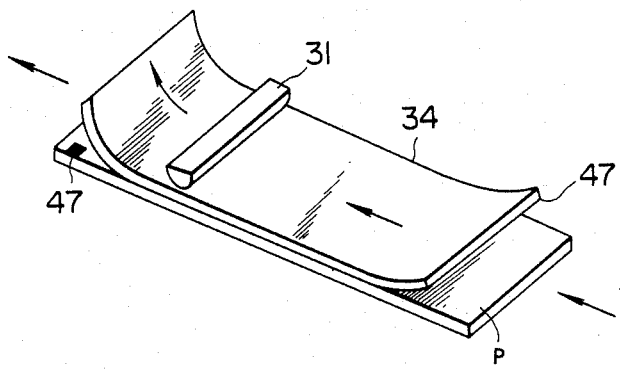
FIG. 6 is a perspective view useful to explain the transfer printing operation.
Figure 7:
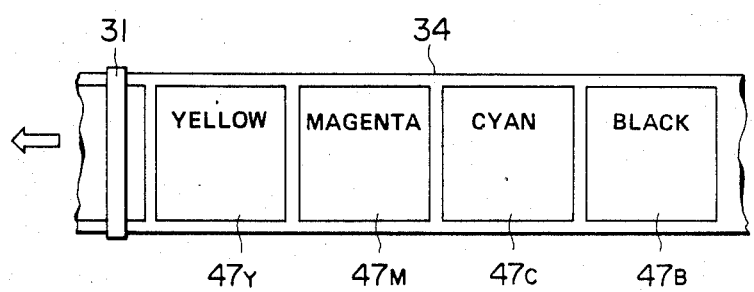
FIG. 7 is a plan view showing the construction of a heat transfer printing ink ribbon.
Figure 8:
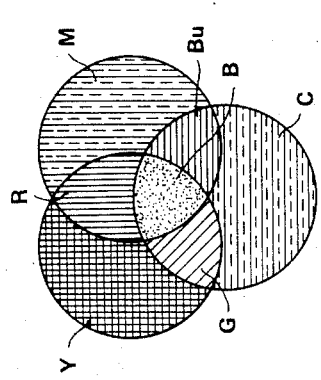
FIG. 8 is a diagram showing the transfer printed colors by using a heat transfer printing ink ribbon.

The thermal head 31 urges the copying paper P against the platen 30 via the heat transfer printing ink ribbon 34 so as to heat fuse inks 47 acting as the color agents on the ink ribbon 34 and transfer print the fused inks onto the copying paper P. As shown in FIGS. 6 and 7, the heat transfer printing ink ribbon 34 has substantially the same width as the copying paper P and is formed with jaxtaposed ink sections $47_Y$, $47_M$, $47_C$ and $47_B$ of yellow (Y), magenta (M), cyan (C) and black (B) colors respectively. With this arrangement, after transfer printing ink of one color, the printing paper P is returned to the printing starting position. In this manner, various colors are accurately superposed. When the ink ribbon 34 is used, seven colors of yellow (Y), magenta (M), cyan (C), black (B), red (R), green (G) and blue (Bu) can be transfer printed as illustrated in FIG. 8.

As above described, the copying paper P is reciprocated by a number of times equal to the number of colors by the rotation of the platen 30. At this time, the copying paper P is guided by first and second guide plates 49 and 50 disposed along the lower surface of a paper discharge tray 48 inclining with respect to the upper surface of the casing 1. Such guidance is effected by first and second diverting gates 51 and 52 respectively provided between the platen 36 and the ends of the first and second guide plates 49 and 50. More particularly, a copying paper P taken out from the paper cassette 42 is conveyed through resist rollers 43 and first diverting gate 51 so that the leading end of the copying paper P is wrapped about the platen 30. As the platen 30 is rotated in the forward direction by a pulse motor, not shown, the copying paper P is conveyed at a constant speed. At the same time, heat generating elements, not shown, of the thermal head 31 arranged in the form of dots in on-line in the axial direction of the platen 30 are caused to generate heat in accordance with the picture image information whereby inks 47 of the ink ribbon 34 are transfer printed onto the copying paper P. The leading end of the copying paper P passed through the platen 30 is guided onto the first guide plate 49 extending along the lower surface of the paper discharge tray 48 by the second diverting gate 52 which is at the solid line position at this time. Upon completion of the transfer printing of the ink 47 of one color, the platen 30 is rotated in the opposite direction to return the copying paper P to the starting position of the transfer printing. At this time, the trailing end of the copying paper P is sent onto the second guide plate 50 extending along the lower surface of the first guide plate 49 by first diverting gate 51 rotated to the dot line position. In this manner, the copying paper P is reciprocated several times to transfer print inks of a plurality of colors. Finally, the copying paper P on which transfer printings of inks of all colors have been completed is guided to the paper discharge rollers 53 by the second diverting gate 52 rotated to the dot line position at this time, and then discharged onto the paper discharge tray 48 by the paper discharge rollers 53.

Figure 9:
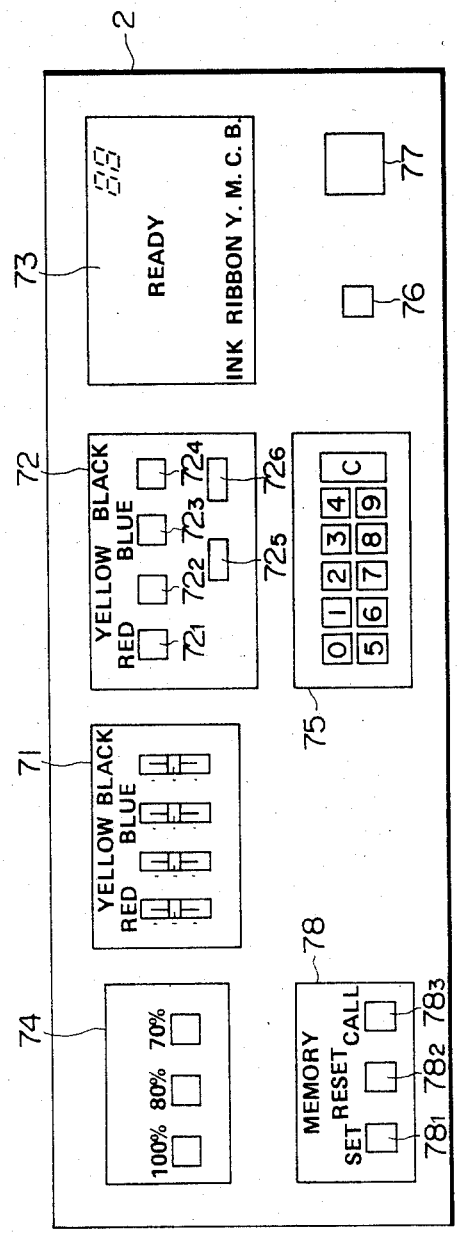
FIG. 9 is a plan view showing an operating panel.

The operating panel 2 is shown in FIG. 9 and constituted by density setters 71 for setting the densities of respective transfer printed colors (for example, red, yellow, blue and black), a color designating unit 72 for designating colors to be transfer printed (for example, red, yellow, blue and black), a display unit 73 for displaying the color of the transfer printing ink ribbon which has been set, and other operating states, the number of copies and copyable state (READY), a magnification setter 74 for setting the magnification of the copying, a ten key unit 75 for setting the number of copies, an interruption key 76 for designating interruption copying, a copying key 77 for starting the copying operation, and a memory setter 78 for setting the status of a memory which stores the picture image of the manuscript. The color designating unit 72 includes a red designation key $72_1$, a yellow designation key $72_2$, a blue designation key $72_3$, a black designation key $72_4$, a seven color designation key $72_5$ and a full color designation key $72_6$. When the red designation key $72_1$ is depressed, red color is designated so that only the red color ink is transfer printed, whereas when the red designation key $72_1$ and the black designation key $72_4$ are depressed, red and black inks are transfer printed. When the seven color designation key $72_5$ is depressed, all colors of red, green, yellow, black, cyan and magenta are transfer printed without containing any half tone, whereas when the full color designation key $72_6$ is depressed all colors including half tones are transfer printed. Each of the color designation keys $72_1$–$72_6$ contains a display lamp in its head. As a result, when a key is depressed, the lamp is lighted to display a designated color. When a source switch of the copying machine is closed, the display lamp of the full color designation key $72_6$ is lighted to provide an all color copying mode. The memory setter 78 is constituted by a set key $78_1$, a reset key $78_2$ and a call key $78_3$.

For example, when the set key $78_1$ is depressed, storing of the picture image is designated, whereas when the reset key $78_2$ is depressed stored memory of the picture image is erased. On the other hand, when the call key $78_3$ is depressed, the picture image is called.

Figure 10:
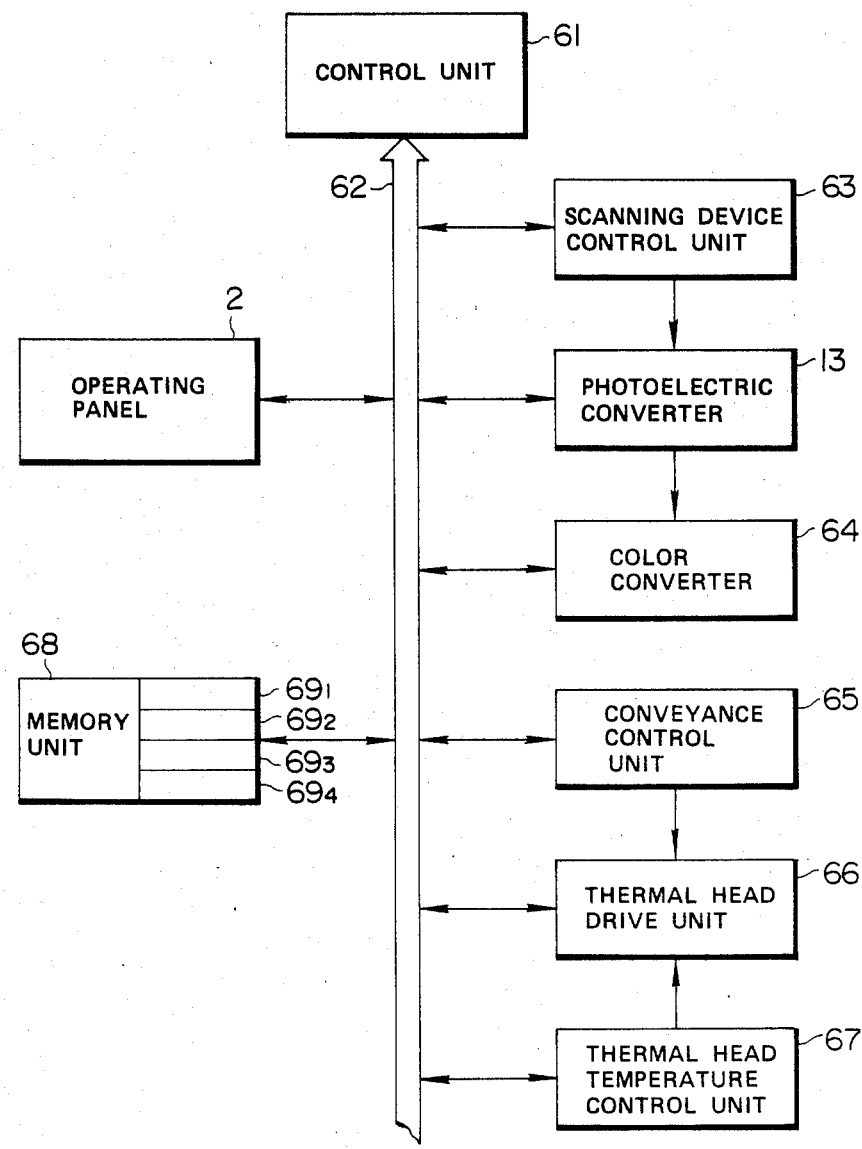
FIG. 10 is a block diagram showing a control circuit.

FIG. 10 is a block diagram showing the control circuit. Thus, it comprises a control unit 61 which controls the operating panel 2 and constituted by a central processing unit CPU and its peripheral circuit. The operating panel 2, scanning device control unit 63, photoelectric converter 13, color converter 64, conveyance control unit 65, thermal head drive unit 66, thermal head control unit 67 and memory unit 68 are connected to the control unit 61 via a bus line 62. The scanning device control unit 63 operates in response to a signal sent from control unit 61 over bus line 62 for controlling the lamp 12, photoelectric converter 13 and scanning motor 18 of the scanning unit 11. In response to a signal sent from the scanning device control unit 63, the photoelectric converter 13 detects the picture image on the manuscript for outputting the color signal of light as above described. The color converter 64 processes a signal supplied from the photoelectric converter 13 for converting the signal into color signals of respective inks of yellow (Y), magenta (M), cyan (C) and black (B). The color converter 64 outputs the respective color signals to the bus line 62 as they are, or outputs the color signals to the bus line 62 afer converting the color signals into color signals having half tones with a dither matrix as will be described later, or outputs the color signals to the bus line 62 after converting them into other color signals not having any intermediate tone with a seven color matrix. Furthermore, the color converter 64 can perform color conversion of a signal sent over bus line 62 for sending a new signal to the bus line 62. The conveyance control unit 65 operates in response to a signal sent from scanning device control unit 63 over bus line 62 to drive a pulse motor for driving the platen 30, motors for driving cores 36 and 37 of the ribbon cassette 35, motors for driving paper feed roller 41, resist rollers 43, and paper discharge rollers 53, and solenoid coils (not shown) activating the first and second diverting gates 51 and 52. In response to signals sent from the conveyance control unit 65 and thermal head temperature control unit 67, the thermal head drive unit 66 controls the energization of the heat generating elements of the thermal head. The thermal head temperature control unit 67 sends a temperature control signal to the thermal head drive unit 66 in response to a signal received from the scanning device control unit 63. The memory unit 68 operates in response to a signal sent from the scanning device control unit 63 over bus line 62 to store an information sent therefrom or to read out stored information. The memory unit 68 is provided with memory means $69_1$–$69_4$ for storing color signals corresponding to one page for respective colors of the ink ribbon and sent from the color converting unit 64, or a dot pattern. For example, memory means $69_1$ stores a color signal or a dot pattern corresponding to yellow (Y), memory means $69_2$ stores a color signal or a dot pattern corresponding to magenta (M), memory means $69_3$ stores a color signal or a dot pattern corresponding to cyan (C), and memory means $69_4$ stores a color signal or a dot pattern corresponding to black (B). The operation of the memory unit 68 is backed up by a battery, not shown, so as to protect the memory contents at the time of interruption of the power supply.

Figure 11:
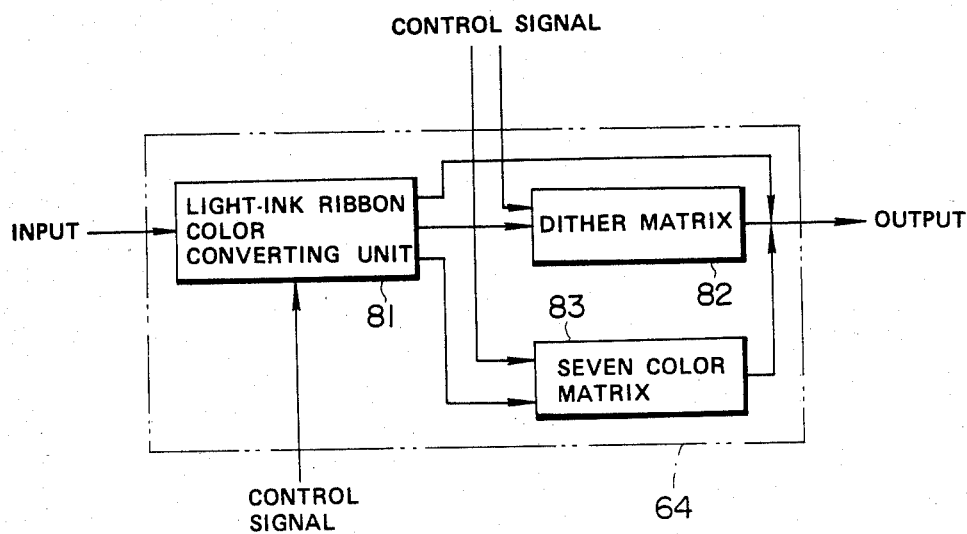
FIG. 11 is a block diagram showing the construction of a color converting unit.
Figure 12:
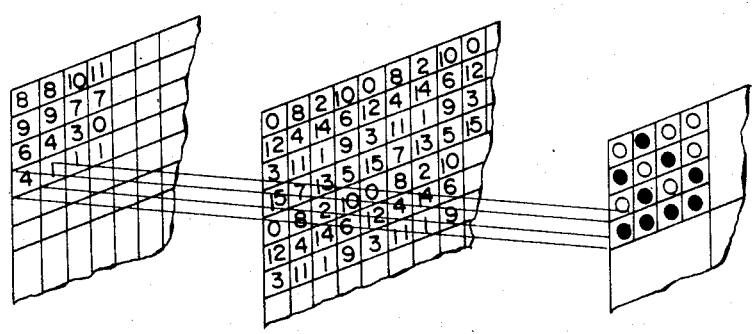
FIG. 12 a perspective view showing a method of color conversion.
Figure 13A:
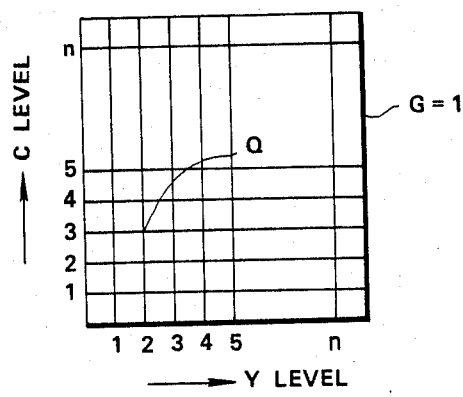
FIGS. 13A–13C are diagrams for explaining Lither method.
Figure 13B:
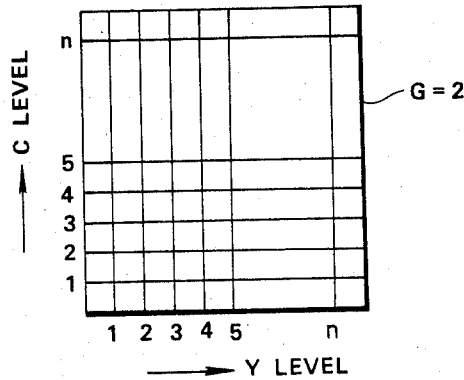
Figure 13C:
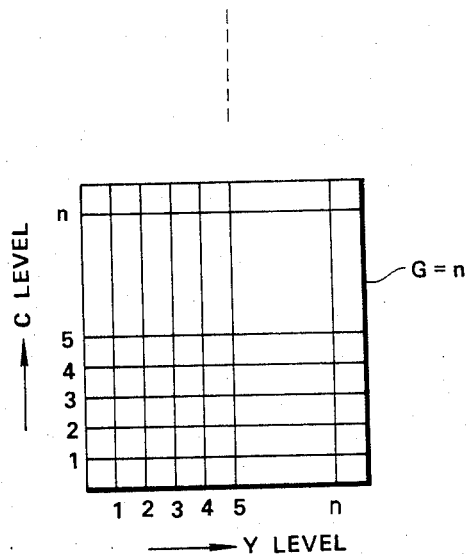

FIG. 11 shows the detail of the color converting unit 64 constituted by a light-ink ribbon color converting unit 81, a dither matrix 82, and a seven color matrix 83. The light-ink ribbon color converting unit 81 converts a color signal outputted from the photoelectric converter 13 into color signals of respective inks of yellow (Y), magenta (M), cyan (C) and black (B). Such color conversion can be made by the following method which is explained with reference to FIG. 12. More particularly, the color converting unit 64 stores a plurality of color conversion tables showing conversion of light color levels to ink color levels as shown in FIG. 12. Suppose now that the color signals of light comprises three colors of green (G), yellow (Y) and cyan (C), and that the signals sent from the photoelectric converter 12 of the scanning device 11 have voltage levels of, for example $G=1$ V, $Y=2$ V, and $C=3$ V, the color converting unit 64 searches a conversion table of $G=1$ V out of the conversion tables described above to read out color levels of the inks stored at the coordinate Q of the crosspoints between $Y=2$ V and $C=3$ V in the conversion table. For example, when the ink ribbon 34 has four colors of yellow (y), magenta (M), cyan (C) and black (B), $Y=d$ level, $M=e$ level, $C=f$ level and $B=g$ level are read out. The color conversion is executed in this manner. The dither matrix 82 binarizes high and low tone picture images according to dither method for converting binarized informations into color signals having half tones. For example as shown in FIGS. 13A-13C, the color signals of respective colors of the ink ribbon are compared in terms of levels with a 4×4 dither matrix in which respective dots correspond to different threshold levels so as to output a signal indicating printing or not in accordance with the result of comparison. The seven color matrix 83 converts the picture image information into color signals not having a half tone by binarizing the picture image information at a predetermined threshold level.

Figure 14:
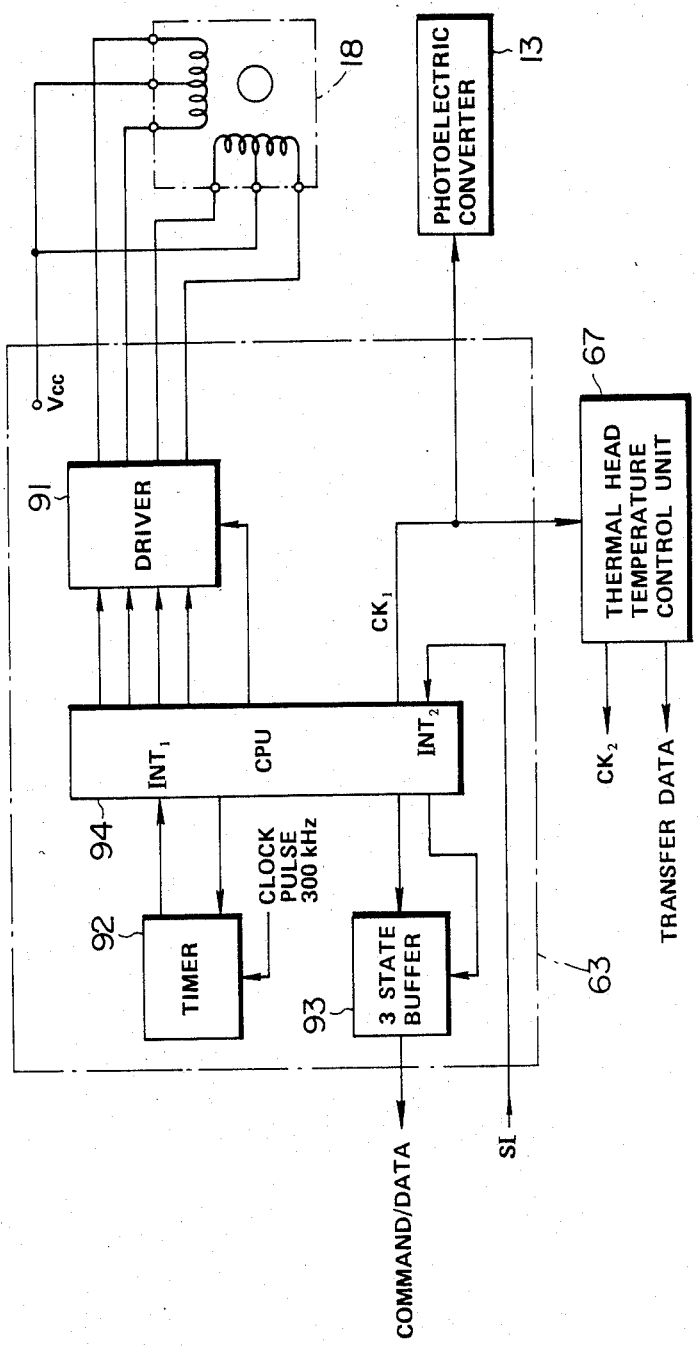
FIG. 14 is a block diagram showing the construction of a scanning device control unit.

FIG. 14 shows the detail of the scanning device control unit 63 comprising a driver 91 for driving the scanning motor 18, a timer 92 for converting the excitation phase switching time of the scanning motor 18, a three state buffer circuit 93 acting as an interface between the buffer circuit 93 and the bus line 62, and a main CPU 94 for controlling above described elements, for processing signals, and for outputting a clock pulse $CK_1$ to the photoelectric converter 13 for effecting photoelectric conversion. The clock pulse $CK_1$ is sent to the thermal head temperature control unit 67 which is supplied with color signals of the inks from color converting unit 64 in synchronism with the clock pulse $CK_1$.

FIG. 15 shows the detail of the conveyance control unit 65 which comprises a driver 102 of a pulse motor 101 for driving the platen 30, a timer 103 for converting the excitation phase switching time of the pulse motor 101, a three state buffer circuit 104 acting as an interface between it and the bus line 62, and an auxiliary CPU 105 for controlling above described elements and for ON-OFF controlling the transfer printing data sent from the thermal head temperature control unit 67 to the thermal head drive unit 66. The auxiliary CPU is supplied with a clock pulse $CK_2$ outputted from the thermal head temperature control unit 67 in synchronism with the transfer printing data. The auxiliary CPU 105 can apply an interruption signal SI to the main CPU 94, the interruption signal SI being supplied to the interruption input terminal $INT_2$ of the main CPU 94.

Figure 16A:
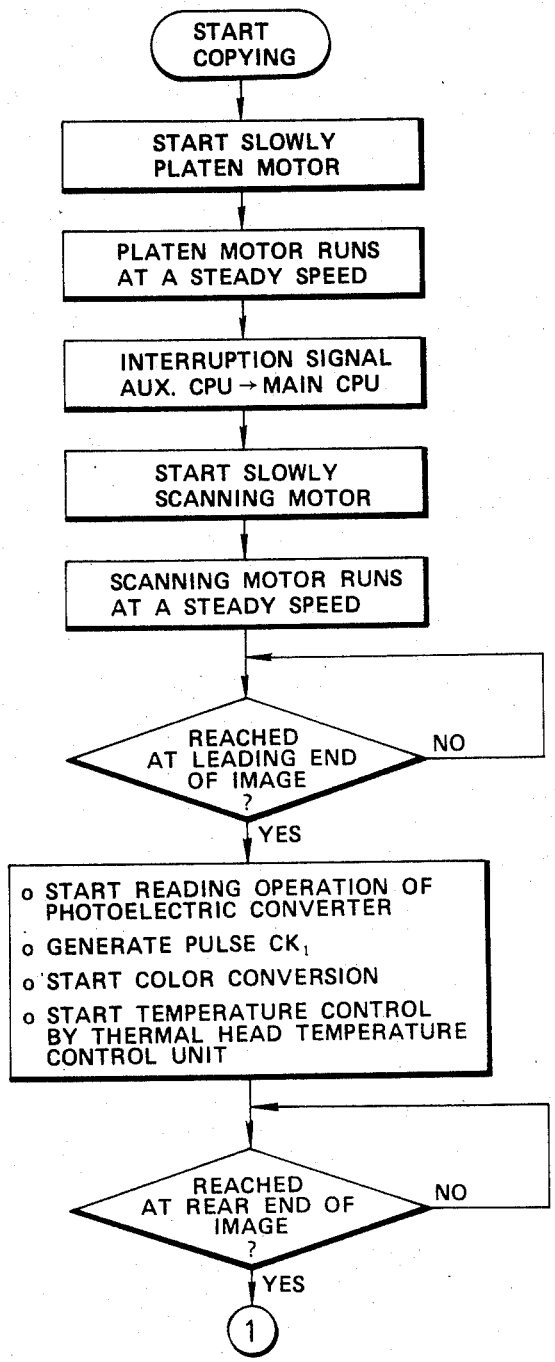
FIGS. 16a and 16b are flow charts useful to explain the operation of the picture image forming apparatus.
Figure 16:
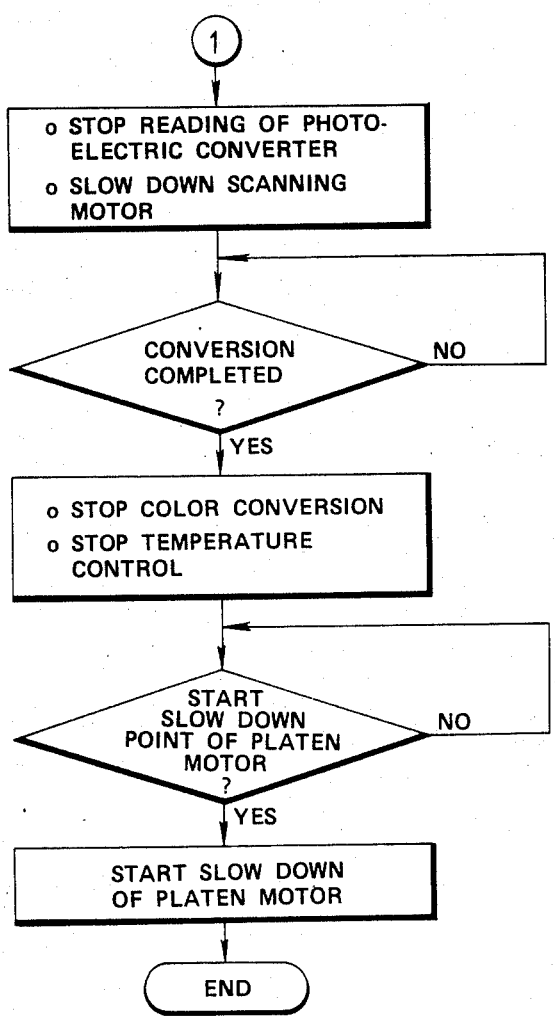
Figure 17:
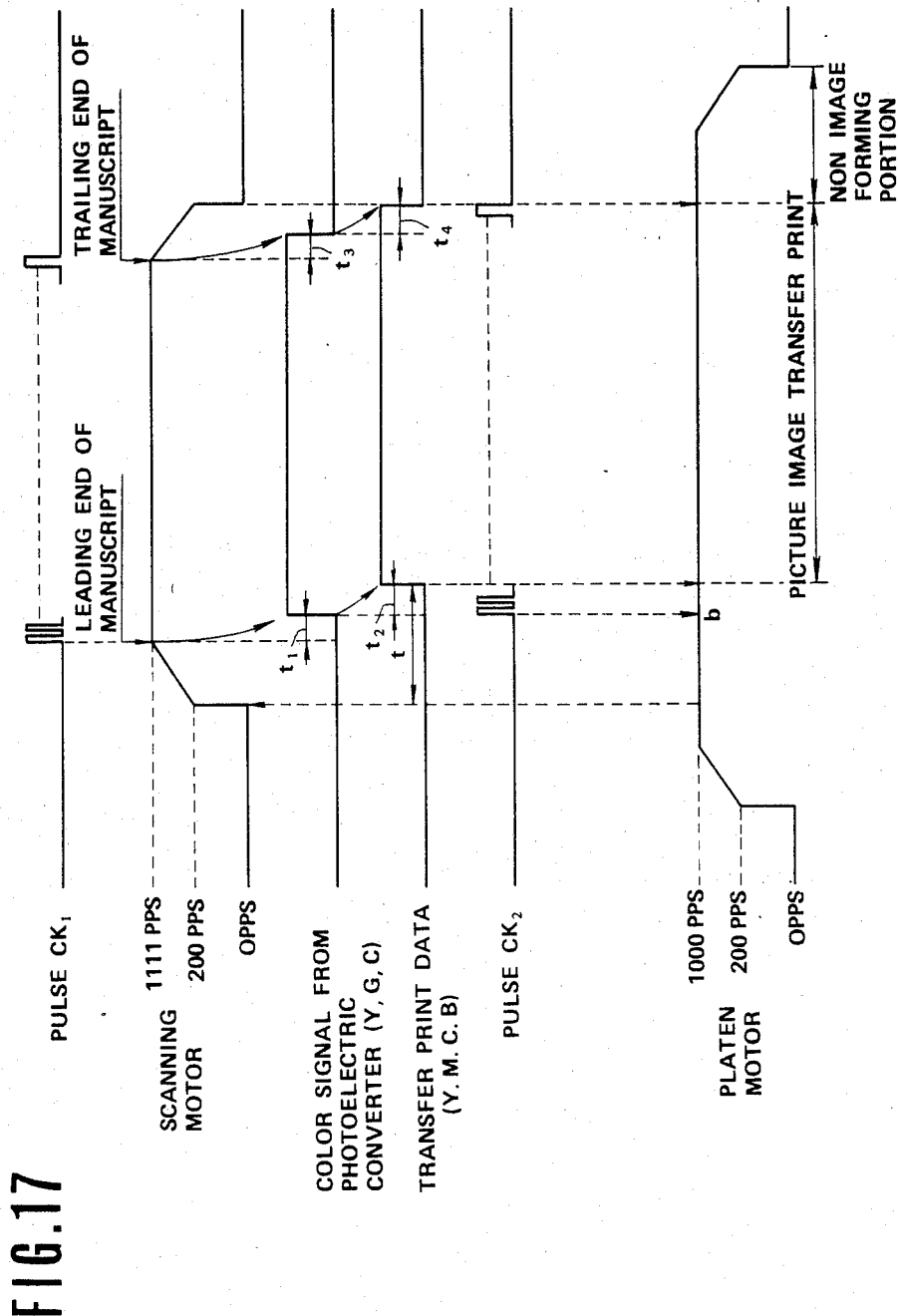
FIG. 17 is a timing chart useful to explain the operations at various elements and signals.

The operation of the picture image forming apparatus including reading of the manuscript to the transfer printing of the picture image will be described with reference to the flow chart shown in FIG. 16 and a timing chart shown in FIG. 17. FIG. 16 shows successive steps following the supply of the copying paper P from the paper feed cassette 42 to the platen 30 at the time of starting the copying operation. As the copying operation starts, the speed of the platen motor 101 increases slowly, and then reaches a steady speed. Thereafter, the auxiliary CPU 105 sends an interruption signal SI to the main CPU 94 for slowly starting the scanning motor 18 which finally reaches a steady state. The speeds of the scanning motor 18 and the platen motor 101 are determined by the reading speed of the manuscript, the picture image transfer printing speed, and the gear ratio between motors and devices driven thereby so that the speeds are not the same. As the scanning motor 18 operates a predetermined number of steps, the photoelectric converter 13 reaches the leading end of the picture image of the manuscript. Then the main CPU 94 causes the photoelectric converter 13 to start reading while at the same time issues a clock pulse $CK_1$. The photoelectric converter 13 reads the manuscript, line after line, in synchronism with the clock pulse $CK_1$ for outputting color signals of the light as above described. the member of the pulses for driving the scanning motor 18 at a constant speed is set to be an integer multiple of the number of clock pulses $CK_1$, so that reading operation of one line of the manuscript and the operation of the scanning motor 18 are synchronized. The color signals of the light from the photoelectric converter 13 appear at a predetermined time $t_1$ later than a time at which the photoelectric converter 13 reaches the front end of the picture image of the manuscript. The main CPU 94 causes the color converter 64 to start color conversion whereby the color converter 64 converts the color signals (Y,G,C) of the light into the color signals (Y, M, C, B) of the inks for outputting the color signals. The color signals (Y, M, C, B) of respective inks are stored in the memory unit 68.

After that, the main CPU 94 causes the thermal head temperature control unit 67 to start temperature control. As a consequence, the thermal head temperature control unit 67 converts a color signal (Y) of ink supplied from the color converter 64 into a transfer printing pulse width (transfer printing data) which is sent to the thermal head drive unit 66 for transfer printing a picture image of the first color, yellow (Y) onto the copying paper P. The transfer printing data from the thermal head temperature control unit 67 appear after elapse of a predetermined time $t_2$ from a time at which the color signals of the light are outputted from the photoelectric converter 13. The clock pulse $CK_2$ is produced earlier than the transfer printing data from the thermal head temperature control unit 67, that is at the same time when the thermal head temperature control unit 67 starts to control the temperature. As the clock pulse $CK_2$ is issued, the auxiliary CPU 105 starts to switch the excitation phase of the platen motor 101 in syncronism with the clock pulse $CK_2$, whereby the platen 30 is operated in synchronism with the clock pulse $CK_2$. This synchronization is performed before the thermal head temperature control unit 67 produces the transfer printing data and at the non-image forming portion of the copying paper P. Consequently, after synchronism has been reached even when the platen motor 101 steps out of the synchronism, the picture printed image would not be affected. The main CPU 94 sets in the timer 92 a time for switching the excitation phase of the scanning motor 18. When a count termination signal of the timer 92 is applied to the interruption input terminal $INT_1$ of the main CPU 94, the excitation phase of the scanning motor 18 is switched and the number of steps of the movement of the motor 18 is added. When the sum of the number of steps of the movement reaches the rear end of the picture image of the manuscript, the main CPU 94 causes the photoelectric converter 13 to stop reading operation to slowly stop the scanning motor 18. The picture image information at the rear end of the manuscript is outputted as the color signals of the light from the photoelectric converter 13 at a time a predetermined time $t_3$ later than a time at which the photoelectric converter reaches the rear end of the manuscript. The color signals are outputted as the transfer printing data via color converter 64 and thermal head temperature control unit 67 a predetermined time $t_4$ later than time $t_3$. Upon completion of the signal at the picture image at the rear end of the manuscript, the photoelectric converter 13, the color converter 64 and the thermal head temperature control unit 67 stop their operations in response to a signal from the main CPU 94. The platen motor 101 continues to operate for an intervaL corresponding to the non-image formed portion of the copying paper even when the clock pulse $CK_2$ extinguishes at the rear end of the picture image of the manuscript. Near the rear end of the copying paper P, the platen motor 101 slows down and finally stops.

By the operation described above, the transfer printing of the first color yellow (Y) completes among colors Y, M, C, and B. For the second color magenta (M) no reading operation of the manuscript image is made but the transfer printing operation is made by using the data of Y, M, C and B obtained by color conversion and have been stored in the memory unit 68 at the time of transfer printing the first color. Thus the data regarding magenta (M) read out from the memory unit 68 is sent to the thermal head temperature control unit 67, and thereafter the picture image transfer printings are made in the same manner as the first color. As this time, when the interruption signal SI is sent to the main CPU 94 from the auxiliary CPU 105, the main CPU 94 reads out the data of magenta (M) from the memory unit 68 such that the clock pulse $CK_2$ will be outputted at the same timing as the first color for sending the data to the thermal head temperature control unit 67. Picture images of the third color cyan (C) and the fourth color black (B) are also transfer printed in the same manner as the picture image of the second color. The data of yellow (Y) is stored in the memory unit 68 for the purpose of transfer printing without reading the picture image of the manuscript where a plural number of copies are made.

Figure 18:
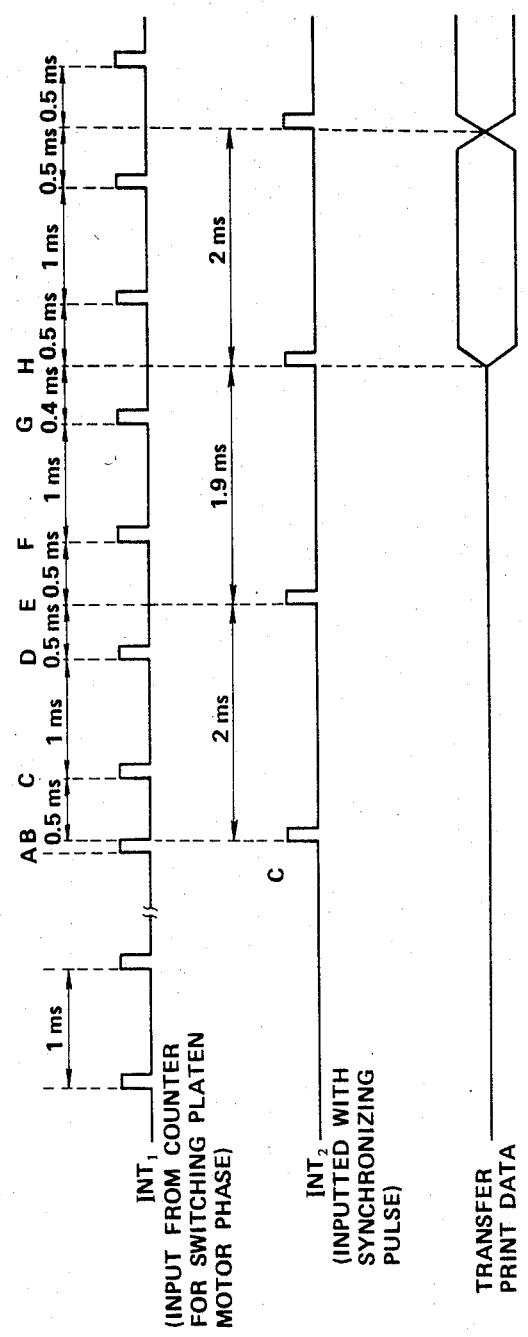
FIG. 18 is a timing chart for explaining a method of synchronizing a platen motor.
Figure 19:
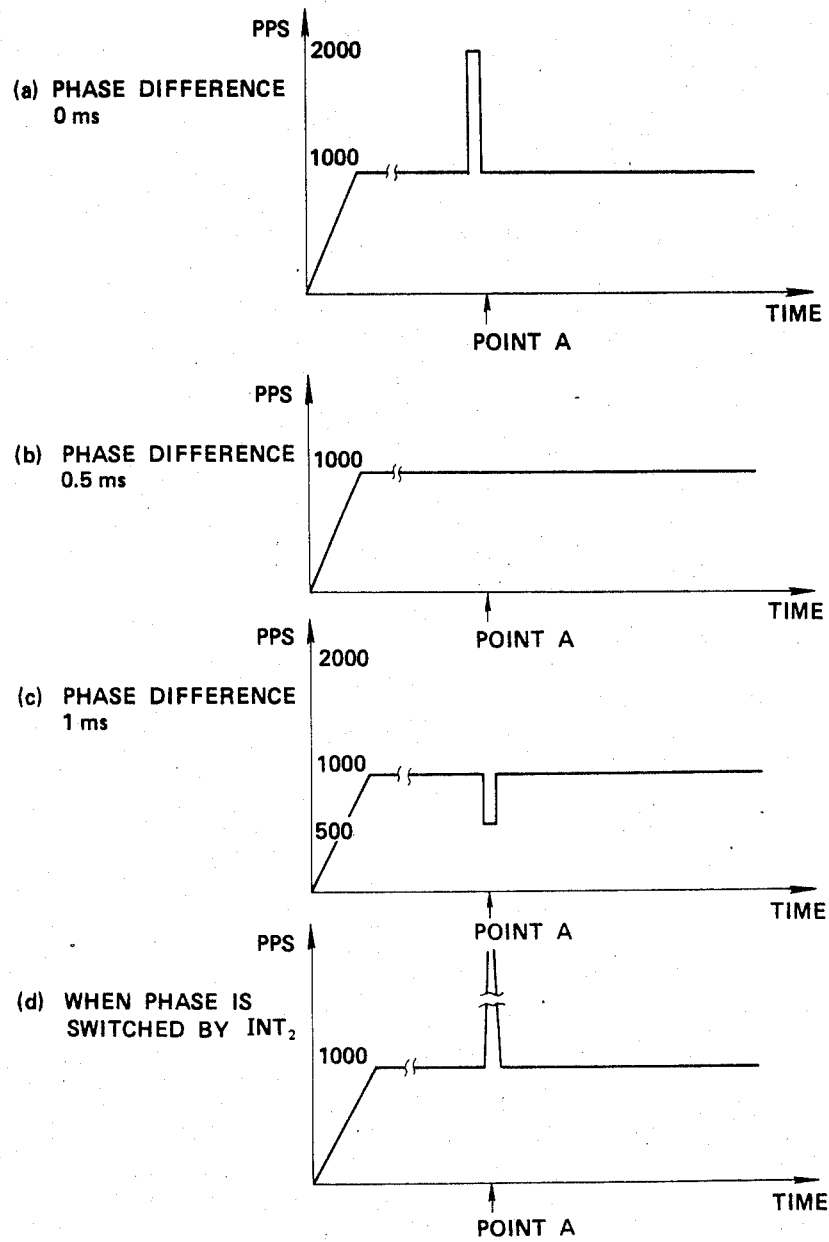
FIG. 19 are graphs for explaining step out of a platen motor.

A method of self running the platen motor 101 (a time is set in the timer 103, the excitation phase of the platen motor 101 is switched in accordance with that time for operating the motor asynchronous with the clock pulse ($K_2$) and then synchronizing the motor with the clock pulse $CK_2$ at point b shown in FIG. 17 (at which the clock pulse $CK_2$ is produced) will be described with reference to FIG. 18. It is now assumed that, while the clock pulse is applied to the interruption input terminal $INT_1$ of the auxiliary CPU 105 of the conveyance control unit 105 from timer 103 at each 1 ms (assuming that the steady speed of the platen motor 101 is 1000 PPS, the clock pulse is applied at each 1 ms, and that for the clock pulse $CK_2$, 2 ms), a clock pulse $CK_2$ synchronous with the transfer printing data is applied to the interruption input terminal $INT_2$ of the auxiliary CPU 105 at point B shown in FIG. 18. The auxiliary CPU 105 sets 0.5 ms in timer 103 which has been set with 1 ms for switching the excitation phase of the platen motor 101 at point C, 0.5 ms later than point B. At the same time, 1 ms is set in timer 103 at point C, and the excitation phase is switched at point D, 1 ms later than point C for setting 1 ms in timer 103. At point E where the timer 103 is still converting, when the clock pulse $CK_2$ is applied to the interruption input terminal $INT_2$ of the auxiliary CPU 105, the timer 103 is stopped and 0.5 ms is newly set there in. When the timer 103 counts up at point F, 0.5 ms later, the exciting phase is switched and 1 ms is set in timer 103. At point G, 1 ms later the excitation phase is switched and 1 ms is set in timer 103 in the same manner. Suppose now that the period (2 ms) of the clock pulse $CK_2$ changes to 1.9 ms, clock pulse $CK_2$ would be applied to the interruption input terminal $INT_2$ of the auxiliary CPU 105, 0.4 ms later than point G. Then the auxiliary CPU 105 sets again 0.5 ms in timer 103 for switching the excitation phase 0.5 ms later. As above described, as the timer 103 counts up, the excitation phase is switched and upon receipt of a synchronizing pulse, a time one half of the normal time is sent in timer 103 without switching the exiting phase and the excitation phase is switched after elapse of the one half time. With this measure, it is possible to prevent step out of the platen motor 101 due to the phase shift of the first signal inputted to the interruption input terminals $INT_1$ and $INT_2$ of the auxiliary CPU 105.

FIGS. 19a–19d are graphs for explaining this step out. More particularly, where the phase difference between point A of curve $INT_1$ shown in FIG. 18 and the first point C of curve $INT_2$ is 0 ms, the excitation phase is switched after 0.5 ms and the driving PPS of the platen motor 101 changes as 1000 pps→2000 PPS→1000 PPS (see FIG. 19a). When the phase difference is 0.5 ms, the excitation phase is switched after 1 ms so that the driving PPS of the platen motor 101 changes as 1000 PPS→1000 PPS→1000 PPS (See FIG. 19b). In a case wherein the phase difference is 1 ms, the excitation phase is switched after 1.5 ms so that the driving PPS of the platen motor 101 changes as 1000 PPS→667 PPS→1000 PPS (see FIG. 19a). Variation in the driving PPS is 667 PPS 2000 PPS. On the other hand, when a signal shown in FIG. 18 is inputted and when the exciting phase is switched in response to this signal, where the phase difference between points A and C is 0 ms, the excitation phase is witched when signal $INT_1$ is inputted and then the exciting phase is immediately switched when signal $INT_2$ is inputted so that the driving PPS of the platen motor 101 changes as 1000 PPS→∞ PPS→1000 PPS (see FIG. 19d) whereby the platen motor steps out.

What is claimed is:

1. Picture image forming apparatus comprising:
    manuscript read means which optically scans a manuscript, for reading a picture image on said manuscript so as to output a picture image information corresponding to said read picture image;
    picture image forming means responsive to said picture image information, for forming another picture image on a copying medium corresponding to said picture image on said manuscript by using a picture image forming medium;
    first control means for controlling said manuscript read means in accordance with a first pulse signal;
    second control means for controlling said picture image forming medium in accordance with a second pulse signal formed independently of said first pulse signal; and
    means for synchronizing said picture information and said second pulse signal controlling said picture image forming medium based on said first pulse signal, wherein said first control means comprises:
    a first timer means which counts a number of clock pulses, for producing a signal when a count of said timer means reaches a predetermined value, a first arithmetic operation processing means having an interruption terminal to be supplied with an output signal of said first timer means, for producing said first pulse signal in accordance with said output signal, wherein said second control means comprises second timer means which counts the number of said clock pulses, for producing a signal when a count of said second timer means reaches a predetermined value,
    a second arithmetic operation processing means having a first interruption terminal to be supplied with an output signal of said second timer means for producing said second pulse signal based on said output signal, and wherein said synchronizing means comprises means which supplies a pulse signal synchronous with said picture information outputted from said manuscript read means, for synchronizing said picture information with said second pulse signal.

2. The picture image forming apparatus according to claim 1, wherein said manuscript read means comprises photoelectric converting means which optically reads line by line said picture image on said manuscript in a main scanning direction, for outputting electric signals of respective lines corresponding to said read picture image, a pulse motor for relatively moving said photoelectric converting means and said manuscript in an auxiliary scanning direction, and wherein said first control means controls said photoelectric converting means and said pulse motor in accordance with said first pulse signal.

3. The picture image forming apparatus according to claim 1 wherein said manuscript read means further comprises signal converting means for outputting a picture image information corresponding to color of said picture image forming medium in response to said electric signal and wherein said control means controls said photoelectric converting means, said pulse motor and said signal converting means in accordance with said first pulse signal.

4. The picture image forming apparatus according to claim 1 wherein said picture image forming means comprises a picture image forming head for forming, line by line, a picture image corresponding to said picture image information outputted from said manuscript read means in a main scanning direction on said copying medium by using the picture image forming medium, a pulse motor for relatively moving said picture image forming means and said copying medium in an auxiliary scanning direction, and wherein said second control means controls said picture image forming means and said pulse motor in accordance with said second pulse signal.

5. Picture image forming apparatus comprising:
manuscript read means which optically scans a manuscript, for reading a picture image on said manuscript so as to output a picture image information corresponding to said read picture image;
picture image forming means responsive to said picture image information, for forming another picture image on a copying medium corresponding to said picture image on said manuscript by using a picture image forming medium;
first control means for controlling said manuscript read means in accordance with a first pulse signal;
second control means for controlling said picture image forming medium in accordance with a second pulse signal formed independently of said first pulse signal; and
means for synchronizing said picture information and said second pulse signal controlling said picture image forming medium based on said first pulse signal, wherein said first control means comprises:
a first timer means for counting a number of clock pulses to produce a signal when a count of said first timer means reaches a first predetermined value, first arithmetic operation processing means for producing said first pulse signal in accordance with an output signal of said first timer means supplied to a first interruption terminal of said first arithmetic operation processing means; said second control means comprises a second timing means for counting the number of said clock pulses to produce a signal when a count of said second timer means reaches a second predetermined value,
second arithmetic operation processing means for producing said second signal in accordance with an output signal of said second timer means applied to a first interruption terminal of said second arithmetic operation processing means, and wherein said synchronizing means comprises means for applying a pulse signal synchronous with said picture information outputted from said manuscript read means to a second interruption terminal of said second arithmetic operation processing means, and
means for supplying an interruption request signal outputted from said second arithmetic operation processing means to a second interruption terminal of said first arithmetic operation processing means for synchronizing said picture information outputted from said manuscript read means with said second pulse signal.

6. The picture image forming apparatus according to claim 5 wherein said manuscript read means comprises photoelectric converting means which optically reads line by line said picture image on said manuscript in a main scanning direction, for outputting electric signals of respective lines corresponding to said read picture image, a pulse motor for relatively moving said photoelectric converting means and said manuscript in an auxiliary scanning direction, and wherein said first control means controls said photoelectric converting means and said pulse motor in accordance with said first pulse signal.

7. The picture image forming apparatus according to claim 5 wherein said manuscript read means further comprises signal converting means for outputting a picture image information corresponding to color of said picture image forming medium in response to said electric signal and wherein said control means controls said photoelectric converting means, said pulse motor and said signal converting means in accordance with said first pulse signal.

8. The picture image forming apparatus according to claim 5 wherein said picture image forming means comprises a picture image forming head for forming, line by line, a picture image corresponding to said picture image information outputted from said manuscript read means in a main scanning direction on said copying medium by using the picture image forming medium, a pulse motor for relatively moving said picture image forming means and said copying medium in an auxiliary scanning direction, and wherein said second control means controls said picture image forming means and said pulse motor in accordance with said second pulse signal.

9. A picture image forming apparatus comprising:
manuscript read means for optically scanning a picture image on a manuscript to produce a picture image information, corresponding to said picture image;
picture image forming means responsive to said picture image information, for forming another picture image on a copying medium corresponding to said picture image on said manuscript by using a picture image forming medium;
first timer means for counting a number of clock pulses to produce a signal when a count of said first timer means reaches a first predetermined value;
first arithmetic operation processing means for producing a first pulse signal controlling said manuscript read means;

second arithmetic operation processing means for producing a second pulse signal controlling said picture image forming means; and second timer means for counting the number of said clock pulses for producing a signal when a count of said second timer means reaches a second predetermined set value;

said first arithmetic operation processing means having a first interruption terminal supplied with an output signal of said first timer means and a second interruption terminal supplied with an interruption request signal from said second arithmetic operation processing means, the output signal of said first timer means and said interruption request signal forming said first signal;

said second arithmetic operation processing means having a first interruption terminal supplied with the output signal of said first timer means, and a second interruption terminal supplied with a synchronizing pulse signal synchronous with said picture information, the output signal of said first timer means and said synchronizing pulse signal forming said second pulse signal.

10. The picture image forming apparatus according to claim 9 wherein said manuscript read means comprises photoelectric converting means for optically reading, line by line, said picture image on said manuscript in a main scanning direction to produce electric signals for respective lines corresponding to said picture image, and a pulse motor for relatively moving said photoelectric converting means and said manuscript in an auxiliary scanning direction, and wherein said first arithmetic operation processing means produces a drive signal of said pulse motor and said photoelectric converting means.

11. The picture image forming apparatus according to claim 9 wherein said picture image forming means comprises a picture image forming head for forming, line after line, another picture image corresponding to said picture information in a main scanning direction by using a picture image forming medium on a copying medium on which a picture image is to be formed, a pulse motor for relatively moving said picture image forming means and said copying medium in an auxiliary scanning direction, and wherein said second arithmetic operation processing means produces a drive signal of said picture image forming head and said pulse motor.

12. The picture image forming apparatus according to claim 11 wherein said second arithmetic operation processing means produces a signal for switching an excitation phase of said pulse motor each time when signal of said second timer means is applied to said first interruption terminal, and decreases a timer time of said second timer means than a normal timer time when said synchronizing pulse is applied to said second interruption terminal.

13. The picture image forming apparatus according to claim 11 wherein said second arithmetic operation processing means switches a timer time of said second timer means to $T_1/2$ when said synchronizing pulse is applied to said second interruption terminal where $T_1$ represents the timer time of said second timer means.

* * * * *